United States Patent

Towne

[11] 3,903,441
[45] Sept. 2, 1975

[54] LEAD BOX FOR DYNAMOELECTRIC MACHINES

[75] Inventor: Raymond A. Towne, Verona, Pa.

[73] Assignee: Westinghouse Electric Corporation, Pittsburgh, Pa.

[22] Filed: May 15, 1974

[21] Appl. No.: 470,103

[52] U.S. Cl. .................... 310/71; 310/85; 317/103; 336/84
[51] Int. Cl.$^2$ ......................................... H02K 11/00
[58] Field of Search ............. 310/71, 42, 85, 67, 66, 310/88, 91, 89, 256; 174/18, 60; 317/103; 336/173, 174, 175, 84

[56] References Cited
UNITED STATES PATENTS

| 1,488,498 | 4/1924 | Hoff | 310/71 |
|---|---|---|---|
| 1,802,110 | 4/1931 | Graham | 310/71 |
| 2,460,415 | 2/1949 | Gaylord | 310/71 |
| 2,652,506 | 9/1953 | Furnas | 310/71 |
| 2,683,227 | 7/1954 | Beckwith | 310/71 |
| 2,728,002 | 12/1955 | Turner | 310/71 |
| 2,742,582 | 4/1956 | Bahn | 310/71 |
| 3,271,714 | 9/1966 | Cossaart | 174/18 |
| 3,456,222 | 7/1969 | Berg | 336/174 |
| 3,716,733 | 8/1929 | Keith | 310/71 |
| 3,774,135 | 11/1973 | Kashima | 336/84 |

*Primary Examiner*—R. Skudy
*Attorney, Agent, or Firm*—G. H. Telfer

[57] ABSTRACT

A lead box is provided by dynamoelectric machines, such as large turbine generators, which includes shielding means within the lead box for shielding the generator leads in a manner to eliminate stray magnetic fluxes. Preferably, the shields are cylindrical structures arranged concentrically with the leads to maintain a symmetrical field within the shields, and current transformers associated with the leads are disposed inside the shields.

6 Claims, 4 Drawing Figures

LEAD BOX FOR DYNAMOELECTRIC MACHINES

BACKGROUND OF THE INVENTION

Large dynamoelectric machines normally have a lead terminal structure into which the main leads of the machine are brought out from the windings for connection to external circuits. In the case of large turbine generators, these terminal structures, usually called lead boxes, take the form of large gas-tight enclosures attached to the bottom of the machine frame. The lead box supports gas-tight, high voltage terminal bushings and the main line and neutral leads of the generator winding are brought into the lead box and there connected to the terminal bushings. The terminal bushings are used to make the necessary connections to external bus systems. In most cases, one or more current transformers are required for each of the leads and in the usual practice these transformers are mounted on the terminal bushings concentrically with the respective leads external to the lead box itself.

This conventional arrangement has several disadvantages, especially in generators of the larger sizes. With the increased ratings of modern turbine generators, the largest sizes of generators may have load currents of the order of many thousands of amperes, which produce very high concentrations of magnetic flux surrounding the generator leads. These high fluxes can cause extreme heating of lead boxes of conventional construction made of magnetic materials such as ordinary steel. It has been necessary, therefore, in many cases to use non-magnetic materials, such as stainless steel, for the lead boxes, which reduces the heating but is extremely expensive and undesirable. Furthermore, the high magnetic fluxes affect the current transformers. Thus, if the current transformers are not shielded, the stray flux from adjacent phases may cause saturation of the transformer cores and seriously affect the accuracy. If the transformers are shielded to protect them from the fluxes of adjacent phases, the fluxes cause severe heating of the shields themselves. Thus, the conventional lead box constructions are not satisfactory for large turbine generators.

SUMMARY OF THE INVENTION

In accordance with the present invention, a terminal structure is provided which eliminates the disadvantages and problems discussed above. For this purpose, a lead box is provided comprising an enclosure for the leads of a large generator which carries gas-tight terminal bushings to which the leads are connected, and which includes shielding means for the leads within the enclosure so that the leads are shielded in a manner which confines the magnetic fluxes to the space within the shields. In this way, no external stray fluxes occur and the heating problems mentioned above are eliminated. Preferably, the shields consist of generally cylindrical structures disposed concentrically with the leads so as to enclose them for effective shielding. This arrangement results in symmetrical magnetic fields inside the cylindrical shields, and since no leakage fluxes from adjacent phases are present, the current transformers associated with each lead can be placed within the shields. The large and expensive shielding means now used for the current transformers are eliminated, and the current transformers are inside the lead box so that the necessity of mounting current transformers on the bushings outside the lead box, as has previously been done, is avoided.

BRIEF DESCRIPTION OF THE DRAWINGS

The invention will be more fully understood from the following detailed description, taken in connection with the accompanying drawings, in which.

DESCRIPTION OF PREFERRED EMBODIMENT

Figure 1:
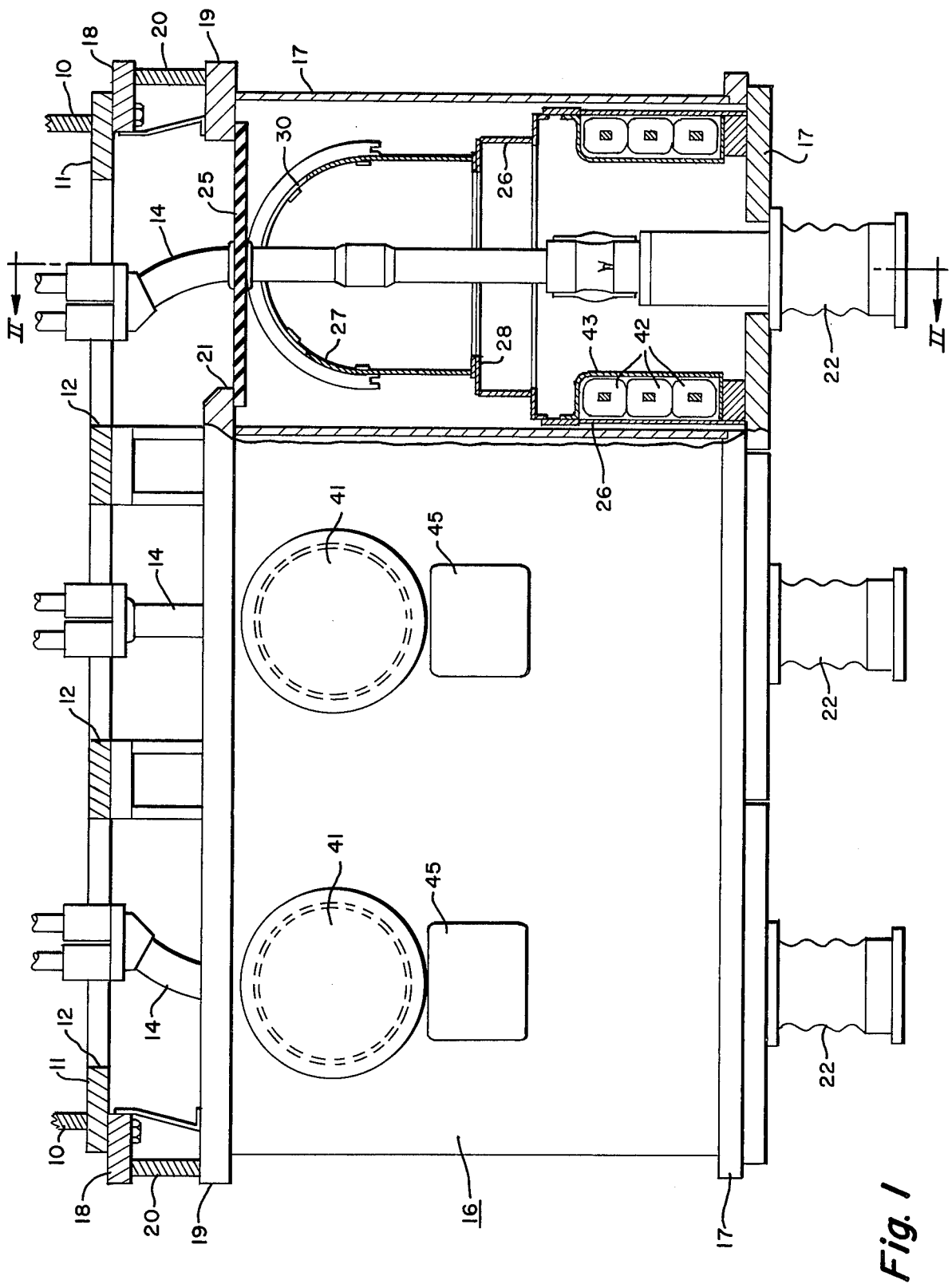
FIG. 1 is a view of a lead box embodying the invention, partly in side elevation and partly in longitudinal section substantially on the line I—I of FIG. 2.

There is illustrated in the drawings, a lead box embodying the invention intended for use with a large turbine generator which may be of any desired type and which has not been illustrated since the lead box might be used with any desired type of large dynamoelectric machine. The generator has a frame 10, of any usual construction, closed at the bottom by a bottom plate 11 having openings indicated at 12 through which the generator leads pass from the frame to the outside of the machine. The lead box illustrated is intended for use with a three-phase machine and three pairs of leads are, therefore, shown extending from the frame of the machine into the lead box, each pair of leads consisting of a line lead 14 and a neutral lead 15. The leads 14 and 15 may be insulated leads of any suitable or usual construction capable of carrying the very high load currents of a large turbine generator.

The lead box 16 itself is a gas-tight enclosure adapted to be attached to the bottom plate 11 of the generator frame. As shown, the lead box 16 is built up of steel plates 17, or other suitable structural members, which form an enclosure of generally rectangular configuration and which are welded or otherwise joined together to form a gas-tight enclosure. The lead box 16 is attached to the bottom plate 11 of the frame 10 by means of frame members 18 which are attached to the plate 11 to form a gas-tight seal in any desired manner. The lead box 16 is closed at the top by a top plate member 19, of any desired configuration, which is attached to the frame members 18 by gas-tight structural members 20, and which has openings 21 for the leads corresponding in size and position to the openings 12 in the plate 11. Suitable means (not shown) may be provided for circulating hydrogen from the generator frame 10 through the lead box for cooling in the usual manner.

Terminal bushings 22 are mounted in the bottom of the lead box 16 with gas-tight joints. The bushings 22 may be of any usual or desired type suitable for carrying the high load currents and for connecting the generator leads to an external bus system. The bushings may, if desired, be internally gas- or water-cooled in any usual manner. As shown particularly in FIG. 2, each pair of leads 14 and 15 extends vertically downward through the openings 12 and 21 into the lead box 16. Each lead is connected to a generally horizontal portion 23 which extends to a position directly above a bushing 22, and another vertical portion 24 of the lead is attached to the portion 23 and connected to the bushing 22. Thus, each pair of leads consists of two relatively closely-spaced vertical portions extending from the frame and two more widely-spaced parallel vertical portions attached to the bushings, with horizontal intermediate portions joining the vertical portions. The vertical portions of the leads where they enter the lead box are preferably supported in an insulating plate 25 attached to the top plate 19 of the lead box.

As previously indicated, each pair of leads is provided with shielding means inside the lead box 16. The shields are preferably of cylindrical configuration and are disposed substantially concentric with the respective leads. For this purpose, a cylindrical shield member 26 is disposed concentric with each terminal bushing 22 and may be made of aluminum or other suitable conductive material. The cylindrical shield member 26 extends upward as shown above the bushing and around the lower part of the vertical portion 24 of the lead. The vertical cylindrical shield members 26 enclosing the terminal bushings 22 of each pair of leads are joined by a horizontal cylindrical shield member 27 which is disposed substantially concentric with the horizontal portions 23 of the leads. The horizontal shield member 27 has openings at each end on its lower side for the vertical cylindrical members 26 and is joined to flanges 28 on those members, as by bolts or other suitable means. The ends of the cylindrical member 27 are closed by end closure members 29 having an upper spherical section and which are attached to flanges at the ends of the cylindrical member 27, as shown. The cylindrical member 27 also has an opening 30 on its upper side through which the leads 14 and 15 pass. It will be seen, therefore, that the vertical cylindrical members 26 and the horizontal cylindrical member 27 together form a generally cylindrical shield which is disposed concentrically with the lead portions 23 and 24 within the lead box 16.

Figure 2:
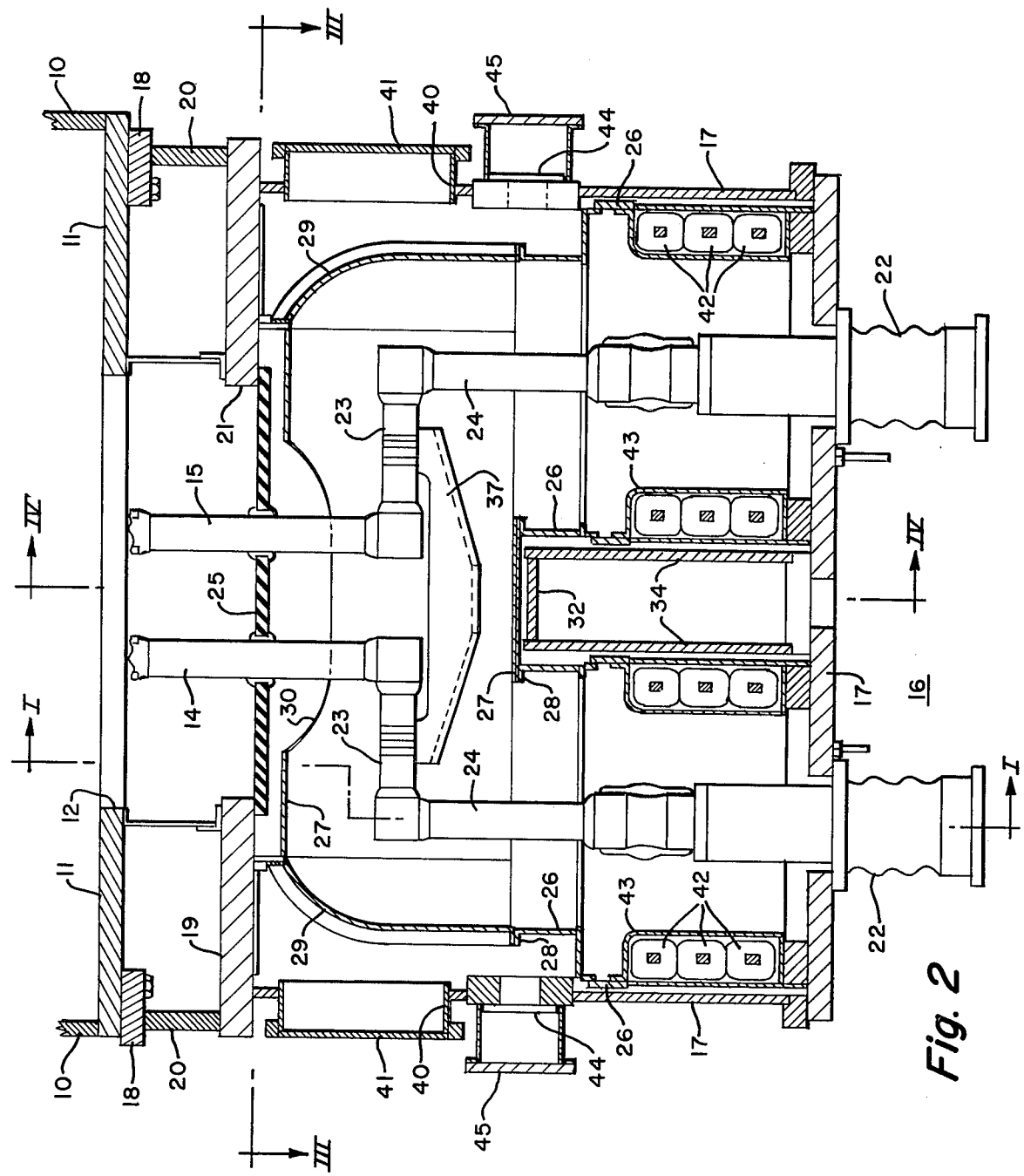
FIG. 2 is a transverse sectional view substantially on the line II—II of FIG. 1.
Figure 3:
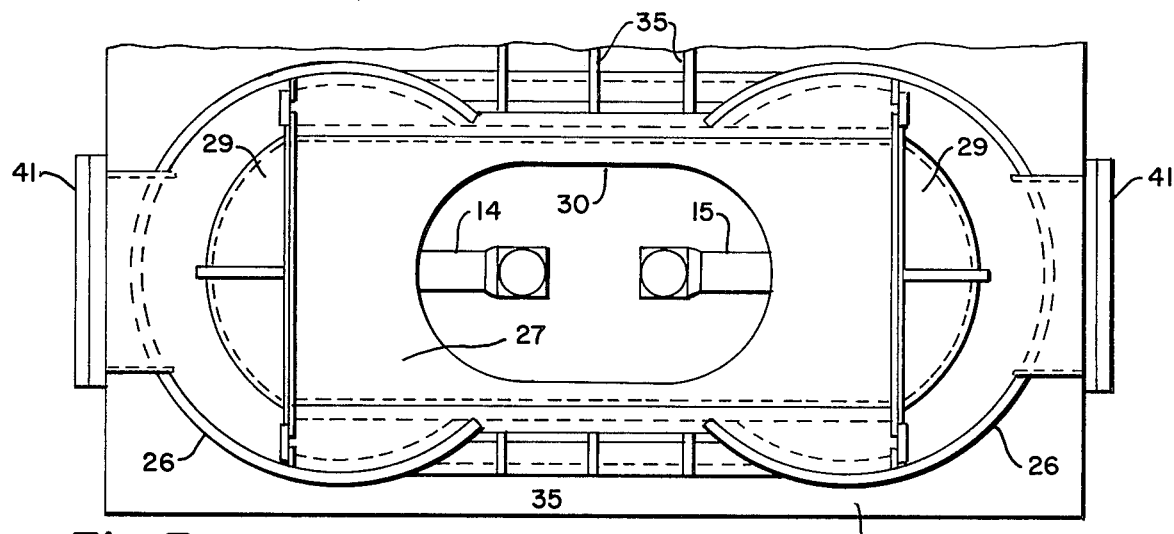
FIG. 3 is a top plan view on the line III—III of FIG. 2.
Figure 4:
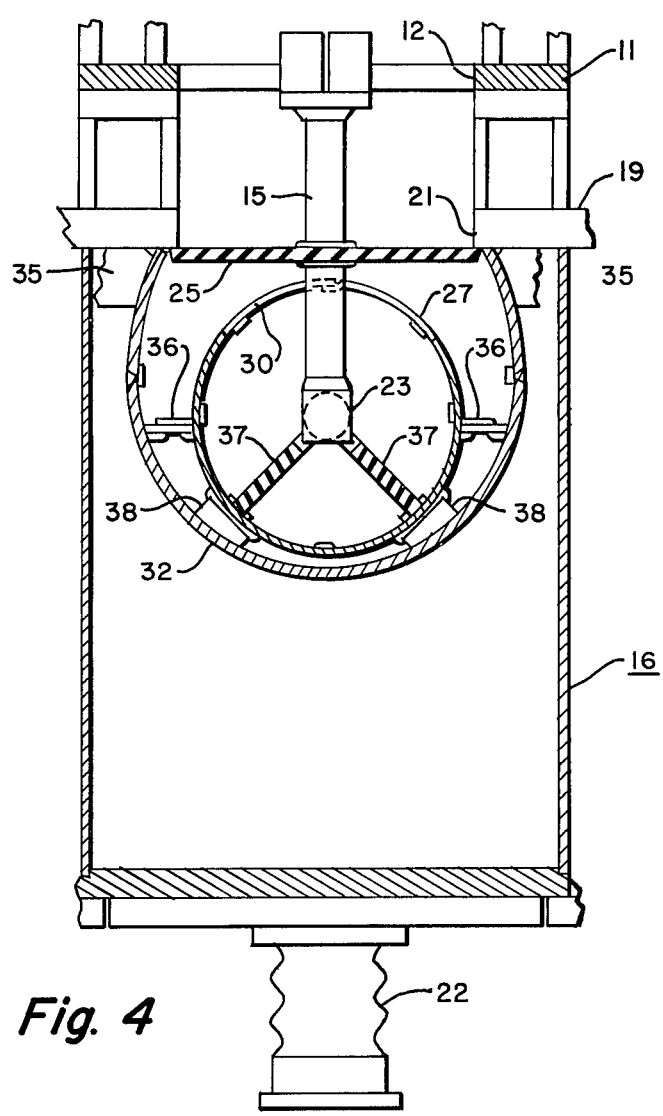
FIG. 4 is a fragmentary transverse sectional view on the line IV—IV of FIG. 2.

The leads and shielding members may be supported in the lead box in any desired manner. As shown, the vertical shield members 26 are attached directly to the bottom plates 17 of the lead box. The horizontal portion 27 of the shield as well as the horizontal lead portions 23 may require additional support. For this purpose, a generally circular protective and support member 32 may be provided encircling the central part of the shield member 27. The member 32 extends to the top insulating plate 25 and may be held in place in any desired manner, as by support plates 34 or upper support members 35. The shield member 27 may be attached to or supported from the support member 32 by support plates indicated at 36 or in any desired manner. The lead portions 23 within the shield 27 may be braced in position by insulating supports 37 engaging the leads as shown in FIG. 2 and bearing on the shield 27. Suitable support pads 38 are provided in the support member 32 in position to support the braces 37 within the shield. Access openings 40 may be provided in the sides of the lead box to permit access to the leads and shields within the lead box, the openings being closed by gas-tight covers 41.

The shields for each pair of leads are electrically continuous from the line terminal bushing to the neutral terminal bushings. The three shields for the three pairs of leads are electrically connected together at the line end and at the neutral end to hold them at the same potential. This may be done by directly attaching the shield members 26 of each pair of leads to the conductive lead box, as shown, or the shields can be connected in any other desired manner.

It will be seen that each pair of leads is enclosed in a conductive shield. The shields effectively confine the magnetic flux of the currents in the leads to the spaces within the shields as any flux reaching the shield induces currents which produce fluxes equal and opposite to the internal flux, so that they cancel and no stray flux exists outside the shield. Thus, the problems discussed above due to the effects of these stray fluxes are eliminated, and the lead box may be made of ordinary magnetic steel rather than the expensive non-magnetic material previously required.

Since the leads are enclosed in concentrically disposed cylindrical shields, as described above, the magnetic field inside the cylindrical shield is almost perfectly symmetrical and no leakage flux from adjacent phases can be present within the shield. For these reasons, it is possible and desirable to mount any necessary current transformers inside the shields. As previously mentioned, in most cases, one or more current transformers are required for each lead for protective relaying, metering, or other purposes. Heretofore, these transformers have usually been mounted on the bushings external of the lead box itself, and shielding of the transformers has frequently been necessary. With this conventional arrangement, stray magnetic flux from adjacent phases has caused the heating and saturation problems discussed above.

In accordance with the present invention, the current transformers are preferably mounted inside the shields. As shown in FIGS. 1 and 2, three current transformers 42 are provided for each lead. Any necessary or desired number of transformers may, of course, be used and they are placed concentrically of the lead in a stack, and enclosed in a suitable housing or support 43 on the inside of the cylindrical shield member 26. The leads from each set of transformers may be brought to a terminal board 44 on the lead box provided with a gastight cover plate 45. A relatively simple mounting is thus provided for the necessary current transformers. They are protected from stray fluxes by their position within the shield, so that superior accuracy is obtained, and no heating effects or saturation effects can occur. The transformers are also protected from mechanical damage or other external forces since they are enclosed within the lead box.

It will now be apparent that a lead box construction has been provided for large generators in which the leads themselves are effectively shielded in a manner which eliminates the problems due to stray fluxes which are unavoidable in previous types of construction, and which also provides for a desirable and effective internal mounting of the current transformers in such a way that they are protected from any stray magnetic fluxes. It will be apparent also that although a particular design has been shown and described for the purpose of illustration, other embodiments and modifications are also possible. Thus, for example, in many cases the neutral leads are connected together by a neutral bus externally of the lead box, and in such cases the neutral bus itself could be disposed inside the lead box of the present invention within the shielding means, so that three of the expensive terminal bushings could be eliminated. As a further modification, it would be possible to design the shielding means with sufficient mechanical strength to serve as an enclosure for the leads as well as a shield, so that the lead box could be eliminated as a separate structure, and the shields themselves could function as a lead box.

I claim as my invention:

1. In a three-phase dynamoelectric machine having a frame and three pairs of leads extending outwardly from the frame, each of said pairs comprising a line lead and a neutral lead, an enclosure for said leads attached to the frame, a terminal bushing for each lead supported on the enclosure, said enclosure including conductive shielding means enclosing each pair of leads, and at least one current transformer associated with each lead inside said shielding means.

2. The combination defined in claim 1 in which the shielding means of each pair of leads is generally cylindrical and substantially concentric with the leads.

3. A terminal structure for a polyphase dynamoelectric machine having leads extending from a frame, said structure comprising an enclosure attached to said frame and enclosing said leads, the leads being disposed in pairs each consisting of a line lead and a neutral lead, a terminal bushing for each lead supported on the enclosure, shielding means within the enclosure for each pair of leads, each of said shielding means comprising a generally cylindrical conducting structure enclosing a pair of leads and disposed substantially concentrically therewith, and at least one current transformer associated with each lead and disposed inside the shielding means.

4. A terminal structure for a polyphase dynamoelectric machine having leads extending from a frame, said structure comprising an enclosure attached to said frame and enclosing said leads, the leads being disposed in pairs each consisting of a line lead and a neutral lead, a terminal bushing for each lead supported on the enclosure, shielding means within the enclosure for each pair of leads, each of said shielding means comprising a generally cylindrical conducting structure enclosing a pair of leads and disposed substantially concentrically therewith, and the leads of each pair having first spaced parallel portions attached to said terminal bushings and second parallel portions more closely spaced than said first portions and extending into the frame, with intermediate portions joining the first and second portions of each lead substantially at right angles thereto, and the shielding means for each pair of leads comprising a first cylindrical portion surrounding each of the first portions of the leads concentrically therewith and an intermediate cylindrical portion joining the first cylindrical portions of the shielding means, said intermediate portion surrounding the intermediate portions of the leads concentrically therewith and having an opening for passage of the second portions of the leads.

5. The combination defined in claim 4 and including at least one current transformer associated with each lead, the current transformers being disposed within the first cylindrical portions of the shielding means.

6. The combination defined in claim 4 in which the shielding means of all the pairs of leads are electrically connected together at the ends of the first cylindrical portions of the shielding means remote from the intermediate portions.

* * * * *